(12) United States Patent
Braxton

(10) Patent No.: US 6,188,881 B1
(45) Date of Patent: Feb. 13, 2001

(54) BELT CLIP AND DEVICE USING THE SAME

(75) Inventor: Thomas R. Braxton, Boynton Beach, FL (US)

(73) Assignee: Motorola, Inc., Schaumburg, IL (US)

( * ) Notice: Under 35 U.S.C. 154(b), the term of this patent shall be extended for 0 days.

(21) Appl. No.: 08/968,007

(22) Filed: Nov. 12, 1997

(51) Int. Cl.$^7$ .................................................. H04B 1/08
(52) U.S. Cl. .................... 455/351; 455/575; 455/38.4; 340/825.44; 224/252
(58) Field of Search ................................. 455/351, 347, 455/38.4, 575, 90; 340/825.44; 224/252, 241; 24/3.11, 3.12, 3.7

(56) References Cited

U.S. PATENT DOCUMENTS

| | | | |
|---|---|---|---|
| 4,534,063 | 8/1985 | Krumin | 455/344 |
| 5,081,709 | * 1/1992 | Benyo et al. | 455/348 |
| 5,379,490 | * 1/1995 | Wandt et al. | 23/3 |
| 5,385,282 | * 1/1995 | Chen | 224/252 |
| 5,613,236 | * 3/1997 | Tajima et al. | 455/351 |
| 5,748,454 | * 5/1998 | Nichols et al. | 455/575 |
| 5,803,323 | * 9/1998 | Hayashi et al. | 224/241 |
| 5,933,772 | * 8/1999 | Wolff | 455/351 |

* cited by examiner

Primary Examiner—Daniel S. Hunter
Assistant Examiner—Darnell R. Armstrong
(74) Attorney, Agent, or Firm—Philip P. Macnak

(57) ABSTRACT

The housing (12) for a portable device (10) has a cavity (40) which engages a boss (28) on a U-shaped clip (22) to prevent a relative rotation between the housing (12) and the U-shaped clip (22) whenever a force is exerted on the free end of the U-shaped clip (22) when fitted over a belt. The boss (28) is disengaged from the cavity (40) whenever a force is applied which deforms the U-shaped clip (22), thereby allowing the housing (12) to be rotated to view an annunciator presenting a message.

The U-shaped clip (22) rotates about a pivot formed by a first boss (26), and second boss (24) having a D-shape, which engage a first bearing (42) and second bearing (44), respectively. The D-shape of the second boss (24) and configuration of the second bearing (44) enable the U-shaped clip (22) to be assembled to/disassembled from the housing (12).

12 Claims, 7 Drawing Sheets

BELT CLIP AND DEVICE USING THE SAME

FIELD OF THE INVENTION

The present invention relates generally to the field of belt clips for portable devices, and more particularly to a latching mechanism for a rotating belt clip for a portable, belt worn device.

BACKGROUND OF THE INVENTION

Belt clips have been provided on many devices so that the devices can be conveniently carried by the person using the device. This is especially true of electronic devices such as pagers, cellular telephones, and numerous other electronic devices. Most prior art belt clips are more or less permanently affixed to the device housing, and often require special tooling to assemble the belt clip to the device housing. Some prior art belt clips have been designed to allow the belt clips to be easily assembled to the device housing when the device is to be carried on the belt or in a pocket by the person using the device. Such belt clips were often easily removed from the device housing, thereby providing a "clipless" devices which were often more conveniently carried in a pocket.

Many devices which are carried on the belt were provided with displays which were used to display information which was received. In many instances, such displays were not always located on the top of the device, but rather were located on the front surface of the device. When a message was to be viewed in such a device, the device generally had to be removed from the belt so as to enable the person using the device to view the message. To alleviate the problem of removing the device from the belt, various prior art holsters were designed which allowed the device to easily removed, or be rotated into a position such that the display could be viewed. While holsters which allowed the device to be removed or rotated resolved the problem of viewing the display, such holsters often added significant cost and were often lost.

What is needed therefore is a belt clip which can be easily assembled to the device housing, and which allows the device to be rotated so that the display can be easily viewed. In addition to allowing the device to be rotated to allow easy viewing of the display, the belt clip should also be rugged and maintain the device in a position latched to the belt clip even when external forces are applied to the device housing.

DESCRIPTION OF THE PREFERRED EMBODIMENTS

Figure 1:
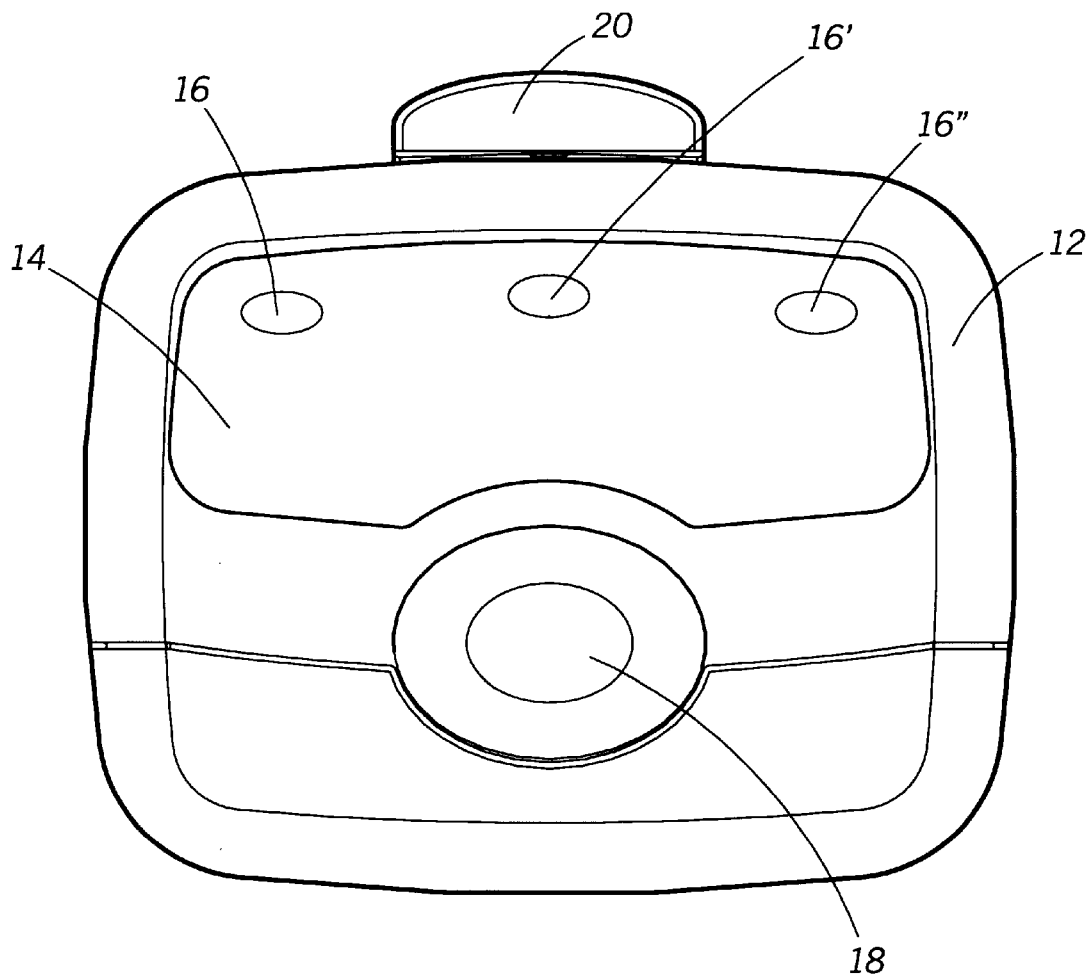
FIG. 1 is a plan view of a potable device in accordance with the present invention.

FIG. 1 is a plan view of a device 10 which can be worn on the belt in accordance with the present invention, The device 10 can be an electronic receiving device such as a paging receiver 1000 as will be described below, as well as other electronic devices which are well known and which are suitable to be carried on a belt or the waistband of a pair of pants or in a shirt pocket. When the device 10 is an electronic receiving device, the electronic receiving device is enclosed within a housing 12. The electronic receiving device can have a viewing area 14 in which a display, such as an LCD display, or a number of visual alert indicators 16, 16', and 16", such as LED's, three of which are shown by way of example, are positioned. One or more controls, such as control 18 can be used to allow the device user to control the operation of the electronic receiving device. The device 10 can be secured to a belt by means of a belt clip 20, as will be described in greater detail below.

Figure 2:
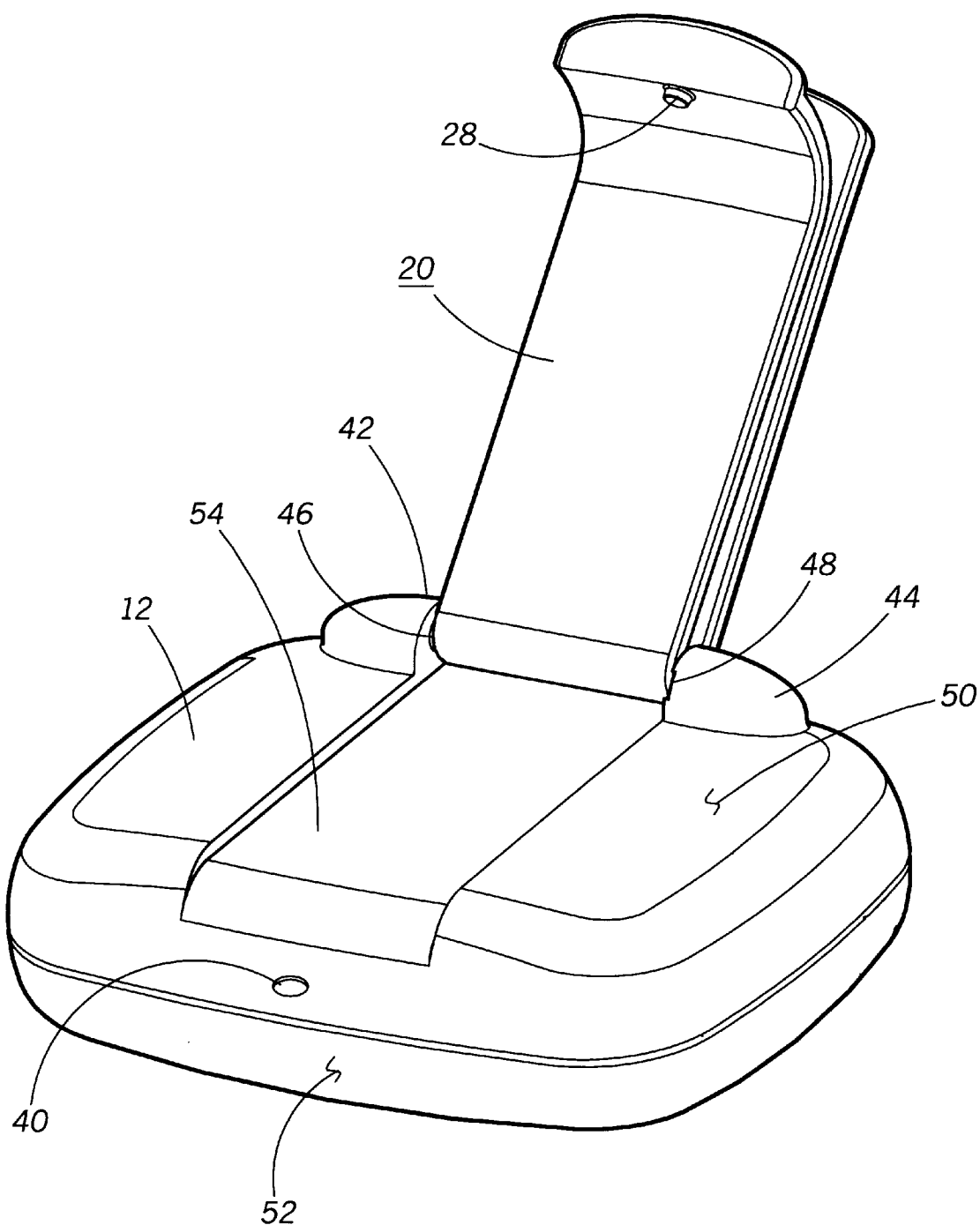
FIG. 2 is a perspective view of the back of the portable device in accordance with the present invention.

FIG. 2 is a perspective view of the device 10 in accordance with the present invention, The device 10 is enclosed in a housing 12. The belt clip 20 is shown in a rotated position which would occur when the belt worn device is worn on the belt to enable viewing an LCD display or visual alert indicators 16, 16', 16" which are located in a viewing area 14. The housing 12 includes two bearing members 42 and 44 which are formed on the rear surface 50 of the housing 12 opposite the bottom surface 52 of the housing 12, The first bearing member 42 is opposed to the second bearing member 44, and the axis of the first bearing member 42 and second bearing member 44 is concentric with the axis of the pivot of the belt clip 20 which will be described below. The belt clip pivot is retained within circular cavities 46 and 48 which will be described further below. When the belt clip 20 is in the normal unrotated position, a boss 28 engages a cavity 40 which is located in the bottom surface 52 of the housing 12. In the unrotated position of the preferred embodiment of the present invention, one of the clip elements, as will be described below, nests into a recess 54 in the back wall 50 of the housing 12, thereby providing a lower profile to the belt clip 20 than would be achieved if the recess 54 were not present. Where the profile of the clip 20 and the housing 12 is not an issue, it will be appreciated that the recess 54 can be eliminated.

The housing 12 is preferably manufactured using a plastic material, such as a polycarbonate plastic which provides ruggedness to the housing 12 and to the bearing members 42 and 44. The belt clip can be manufactured from any of a numbers of materials, such as plastic using an injection molding process, sheet metal using a metal stamping and forming process, or metals such as aluminum, magnesium or zinc can be used using a casting process.

Figure 3:
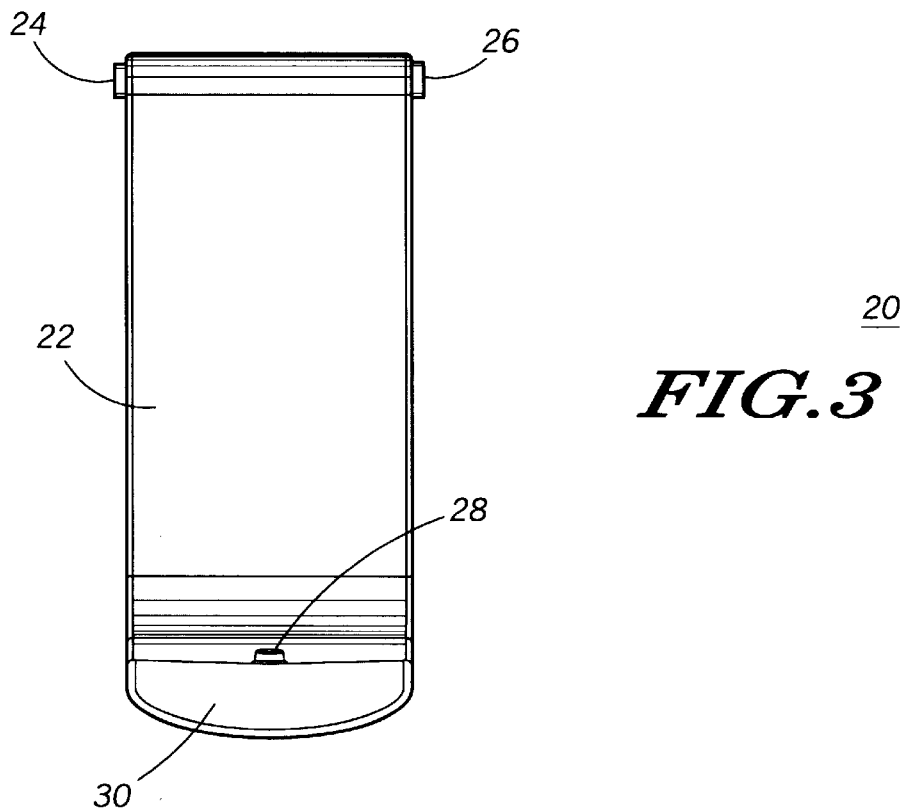
FIG. 3 is a rear elevational view of a belt clip in accordance with the present invention.

FIG. 3 is a rear elevational view of a belt clip 20 in accordance with the present invention, Shown in this view is a rear clip element 22, a boss 28 and a pivot 24, 26. The pivot for the belt clip 20 is provided by two bosses a first boss, boss 24 and a second boss, boss 26. The belt clip 20 also preferably incorporates a release mechanism 30 which is used to facilitate disengaging the boss 28 using a finger, as will be described in further detail below.

Figures 4, 5, 6:
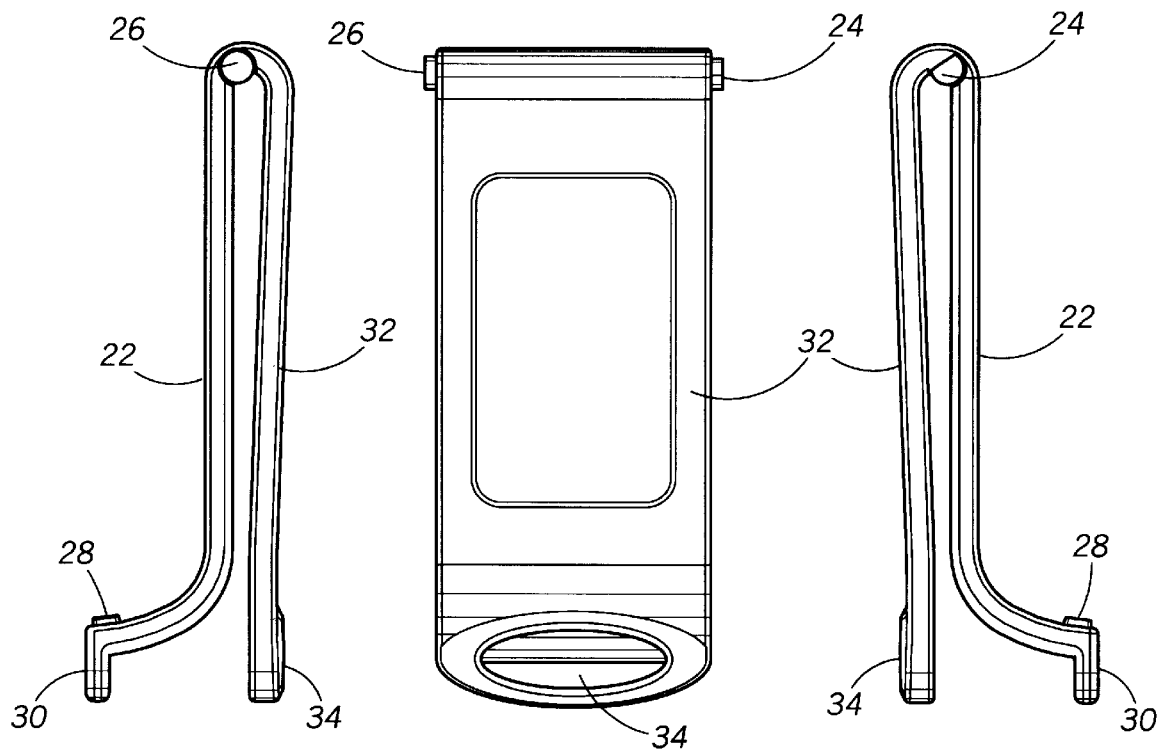
FIG. 4 is a front elevational view of a belt clip in accordance with the present invention.
FIG. 5 is a left side plan view of a belt clip in accordance with the present invention.
FIG. 6 is a right side plan view of a belt clip in accordance with the present invention.

FIG. 4 is a front elevational view of a belt clip in accordance with the present invention, Shown in this view is a front clip element 32, and the pivot 24, 26. An opening 34 in the front clip element 32 can be provided to be used to attach an inexpensive lanyard to the belt worn device 10.

FIG. 5 is a left side plan view of a belt clip 20 in accordance with the present invention, This view and FIG. 6 which is a right side plan view of a belt clip 20 in accordance with the present invention, show the features of the pivot 24, 26. As shown, the belt clip 20 is formed from a U-shaped member 22, 32 which is intended to be hooked over a belt, although it can also be used to be hooked over the waistband of a pair of pants, the waistband of a skirt, or a shirt pocket as well. The U-shaped member includes a first clip element, the back clip element 22, one end of which couples to the pivot and one end is free end and includes a boss 28. The U-shaped member also includes a second clip element, the front clip element 32, one end of which couples to the pivot and one end is free.

It is important to notice that the boss 24 which forms part of the pivot is different from the boss 26 which forms the other part of the pivot. The boss 26 has a profile which is circular, while the boss 24, has a profile which is substantially D-shaped, i.e. circular with a flat cut parallel to the longitudinal axis of the pivot. The profile of the D-shaped boss 24 subtends an arc-length which is intentionally greater than 180°. The function of the belt clip to secure the device housing 12 and to allow the housing to freely rotate will be described in further detail below.

Figure 7:
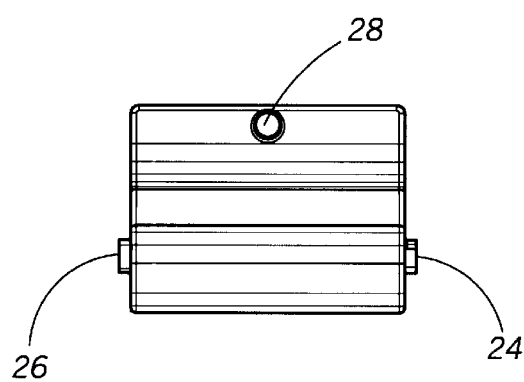
FIG. 7 is a top plan view of a belt clip in accordance with the present invention.

FIG. 7 is a top plan view of a belt clip 20 in accordance with the present invention, Shown in this view is the pivot 24, 26 and the boss 28.

Figure 9:
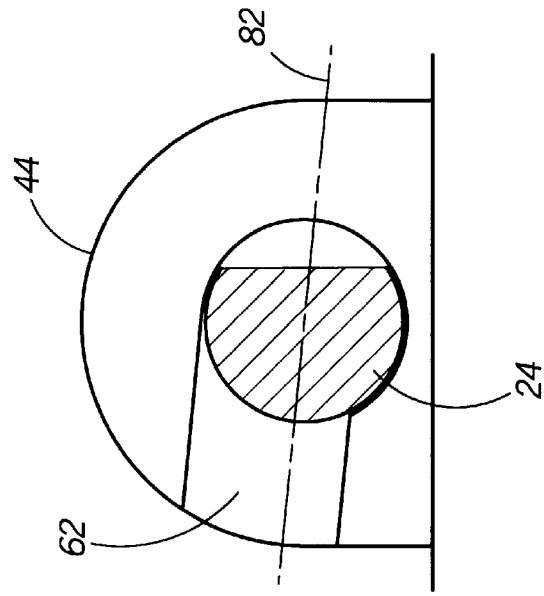
FIGS. 8 and 9 are plan views of a bearing member in accordance with the present invention.
Figure 8:
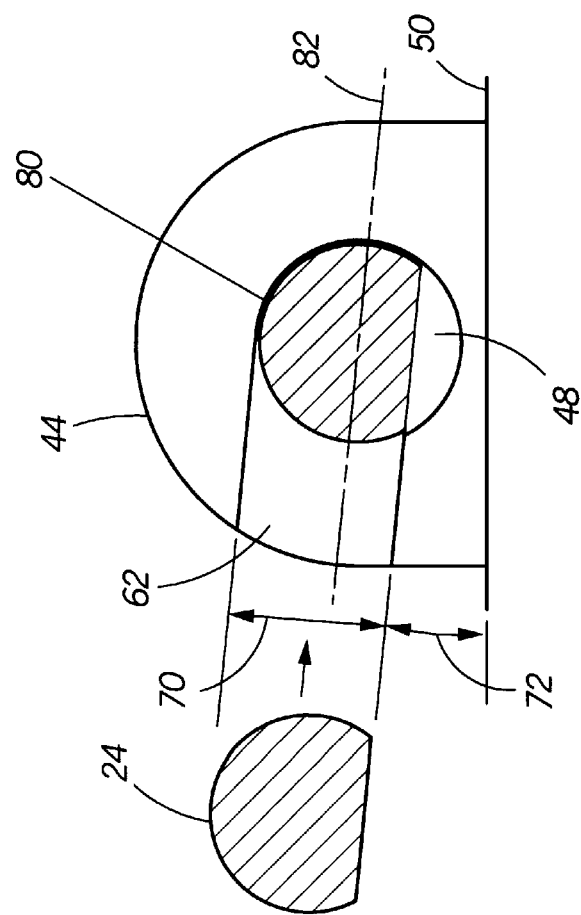
Figure 10:
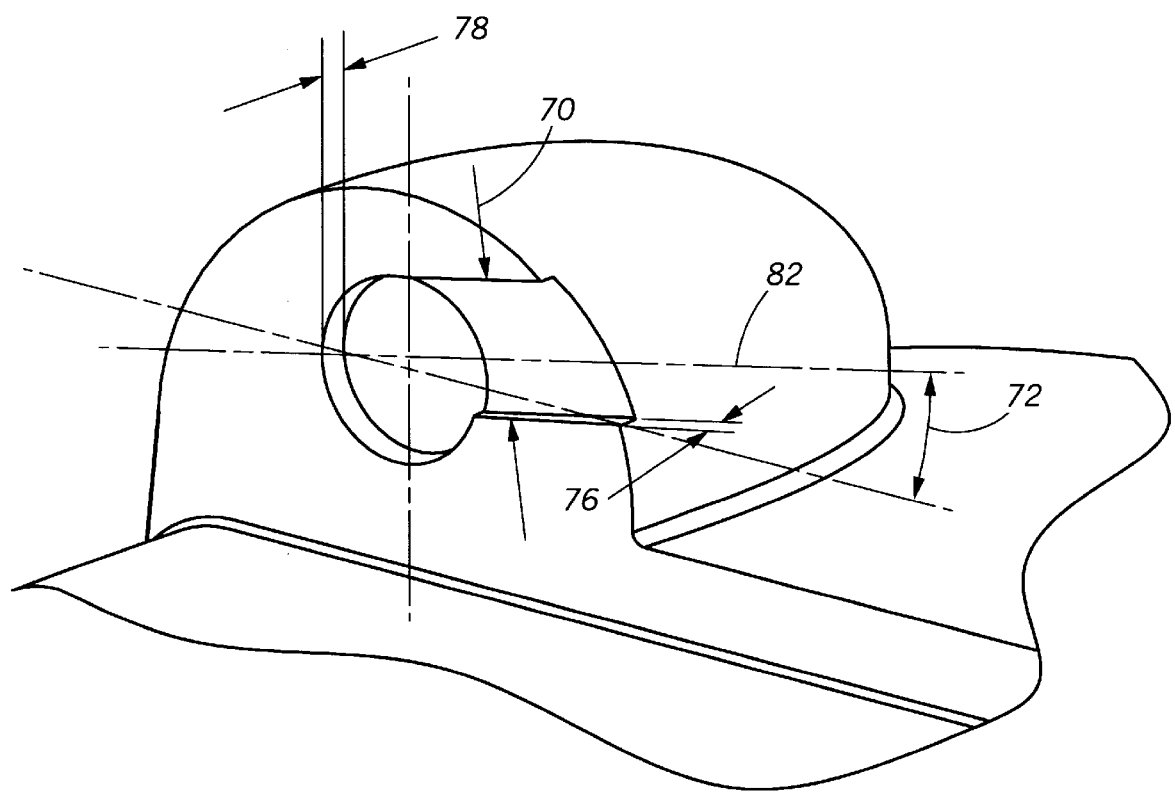
FIG. 10 is an perspective view of the bearing member of FIGS. 8 and 9.

FIGS. 8 and 9 are plan views of a bearing member in accordance with the present invention, A first bearing member 46, which is not shown includes a circular cavity which engages the boss 26 forming a portion of the pivot. The second bearing element 44, shown in FIG. 8, includes a circular cavity 48 and also includes a slot 62 formed perpendicular to the axis of the circular cavity 48. One surface of the slot 62 is tangent at point 80 to the circumference of the circular cavity 48, and an axis 82 of the slot 62 is at a predetermined angle 72 relative to the back surface 50 of the housing 12. The width 70 of the slot 62 is sufficient to accommodate boss 24, when the D-shape of the boss is properly aligned to the slot 62, as shown in FIG. 8. The depth 78, shown in FIG. 10, of the circular cavity 48 is sufficient to engage the length of the boss 24, while the depth 76, shown in FIG. 10, of the slot 62 is less than required to accommodate the length of the boss 24, thereby creating an interference fit.

The belt clip 20 is assembled to the housing 12 by first inserting the boss 26 into the circular cavity 42 of the first bearing member 46. The U-shaped member is then oriented such that the flat of the D-shape of the boss 24 aligns with the bottom of the slot 62, as shown in FIG. 8, and then the U-shaped member is pivoted in a manner which forces the boss 24 through the slot 62 into bearing member 44 until the boss 24 drops into the circular cavity 48. Once the U-shaped member engages both bearing members 42 and 44 as described, the bosses 24 and 26 of U-shaped member will not disengage the circular cavities 46 and 48 under any rotation of the housing 12 relative to the U-shaped member, except at the precise angle of insertion 72 of the boss into the slot 62. FIG. 9 shows the relative orientation of the boss 24 to the slot 62 when the belt clip is latched to the housing.

Figure 11:
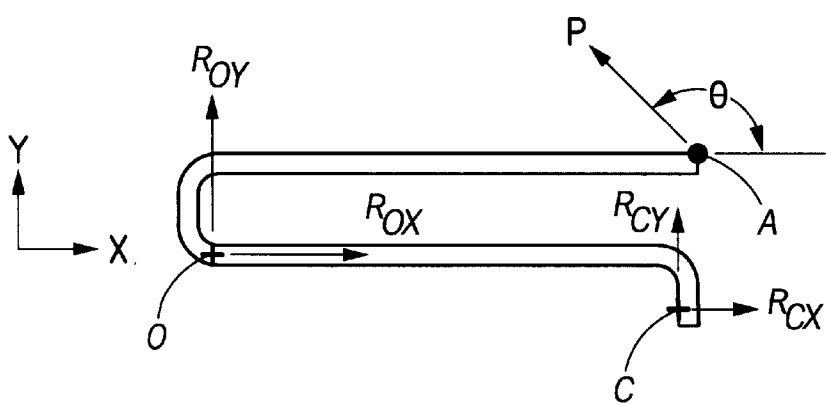
FIG. 11 is a free body diagram illustrating the static loading of the belt clip in accordance with the present invention.

FIG. 11 is a free body diagram illustrating the general case of the static loading of the belt clip. The X-axis lies horizontally on the page, while the Y-axis lies vertically on the page. A point load of magnitude P is applied at point A which would generate a counterclockwise rotation about the axis of rotation (O). Reaction forces are exerted at the axis of rotation (O), which corresponds to the pivot axis, and at the boss (C), which corresponds to the boss 28 when engaged with the cavity 40. At static equilibrium, the forces along the X axis are defined by $$\Sigma F_X = P \cos(\theta) + R_{OX} + R_{CX} = 0$$

where $P \cos(\theta)$ is the force along the X-axis generated by the point load at point A, $R_{OX}$ is the component of the reaction force induced at point O along the X-axis, and $R_{CX}$ is the component of the reaction force induced at point C along the X-axis.

The forces along the Y axis are defined by $$\Sigma F_Y = P \sin(\theta) + R_{OY} + R_{CY} = 0$$

where $P \sin(\theta)$ is the force along the Y-axis generated by the point load at point A, $R_{OY}$ is the component of the reaction force induced at point O along the Y-axis, and $R_{CY}$ is the component of the reaction force induced at point C along the Y-axis.

Likewise, the moments about the axis of rotation (O) are defined by $$\Sigma M_O = P \sin(\theta) A_X + P \cos(\Theta) A_Y + R_{CY} C_X + R_{CX} C_Y = 0$$

where $A_X$ is the X component of vector OA, $A_Y$ is the X component of vector OA, $C_X$ is is the X component of vector OC, and $C_Y$ is is the Y component of vector OC.

It will be appreciated that deformation of the clip, and in particular the inner clip element 32, is required to disengage the boss 28. The deformation of the clip cannot be produced by applying a load at point A. As described above, this deformation can only occur when a force is applied to the release member 30.

Figure 12:
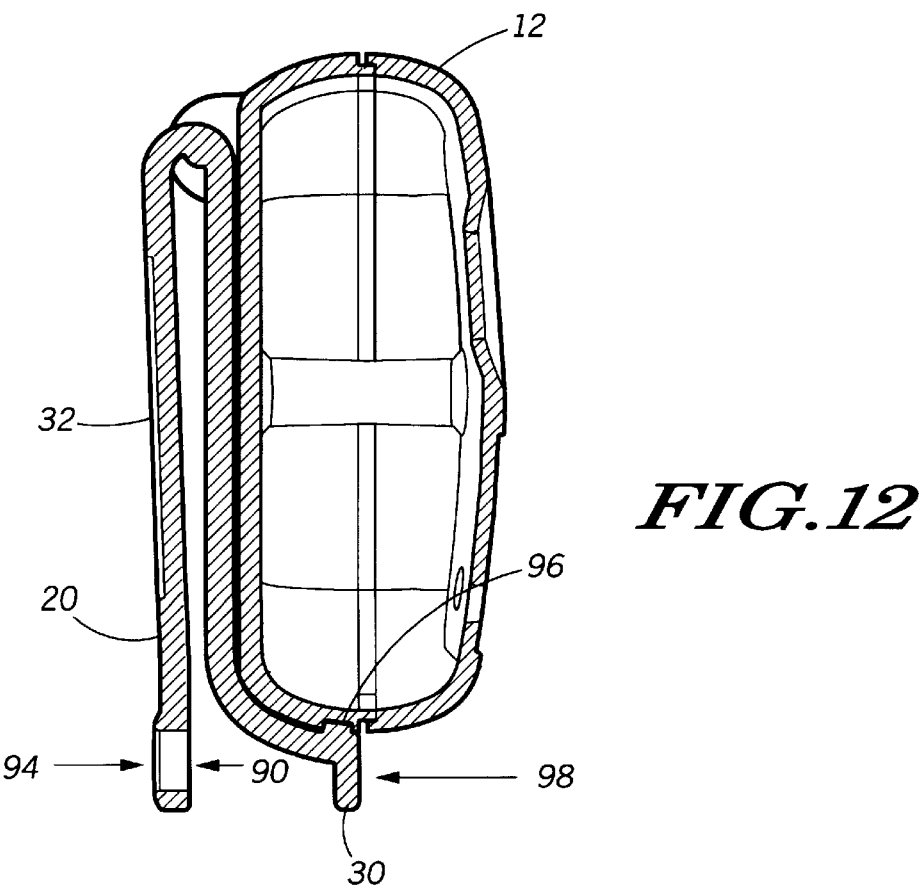
FIG. 12 is a cross-sectional view of the portable device in accordance with the present invention.

FIG. 12 is a cross-sectional view of the device 10 in accordance with the present invention, and is used to illustrate the principle behind the operation of the clip latching mechanism. When the device 10 is worn on the belt, a waistband, or hooked to a purse, a pocket, or any other item of apparel, any applied force 90 which is applied to the rear clip element 32 results in a rotation of the front clip element 22 relative to the rear clip element 32. This rotation, or spreading of the U shaped member, results in a reaction force 96 being developed at the boss 28. The higher the applied force 90 is, the higher the reaction force 96 generated would be. This results in the boss 28 being more securely seated in the cavity 40 and therefor less likely that the device housing 12 would be disengaged and rotated to the viewing position.

The device housing 12 can be released from the boss 28 in two different ways. One way is to apply forces 94 and 98 using as an example a finger and thumb to pinch the rear clip 22 and the release member 30 toward each other. This pinching motion results in a deformation of the front clip element 22 releasing the boss 28 from the cavity 40, allowing the device housing 12 to then be freely rotated to view the display. A second way to release the boss 28 is to push on the release member 30, which again would result in a deformation of the front clip element 22 releasing the boss 28 from the cavity 40, allowing the device housing to then be freely rotated to view the display.

In summary, any force applied to the device housing which causes the back clip element 32 to separate from the front clip element 22 would more tightly engage the boss 28 with the cavity 40, thereby preventing the device housing from being able to be rotated to the viewing position. Likewise, any force which is applied to the release member 30 which is sufficient to cause deformation of the front clip element 22 would release the boss 28 from the cavity 40, thereby allowing the device housing 12 to be freely rotated to the viewing position.

Figure 13:
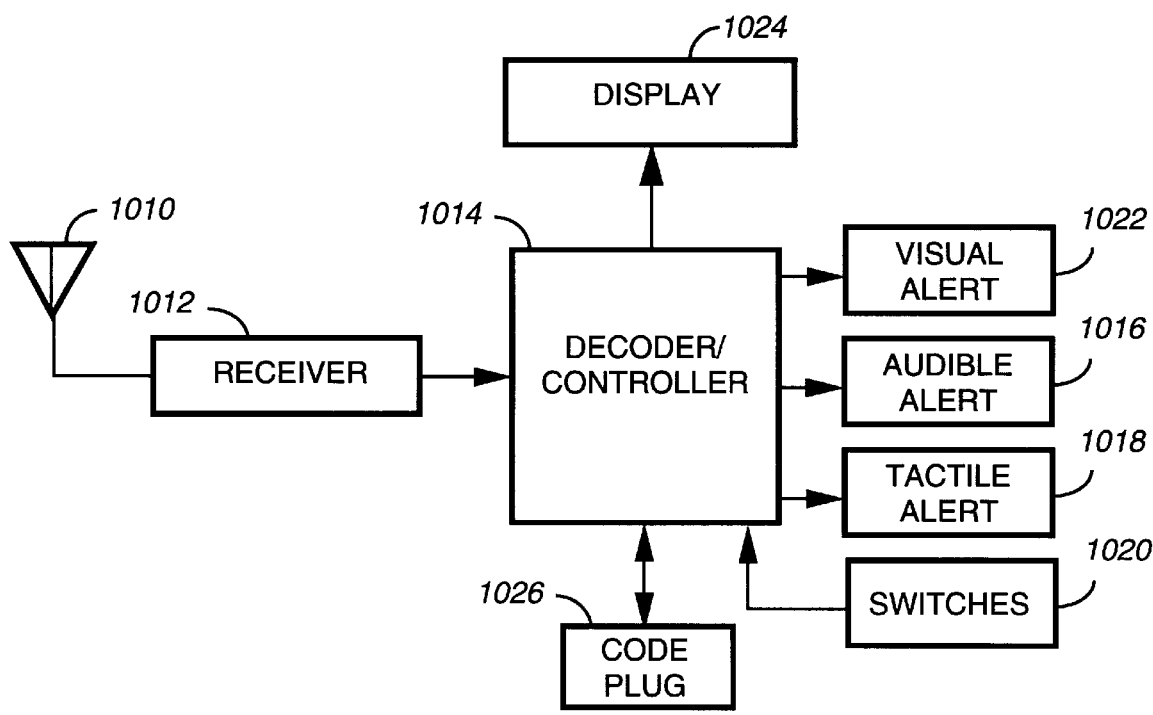
FIG. 13 is an electrical block diagram of the portable device of FIG. 1.

FIG. 13 is an electrical block diagram of the belt worn device of FIG. 1. Information transmitted is intercepted by antenna 1010 and is then processed by a receiver 1012 to recover the information. When the belt worn device 10 is a communication receiver, such as a pager, the recovered information can be either sequences of tones or digital information which identifies the pager and which also represents messages. The sequences of tones or digital information is processed by a decoder/controller 1014, and when the received information matches information stored in a code plug 11026 an alert is generated. The alert can be audible, being delivered by an audible alerting device 1016, such as a speaker or a transducer. The alert can also be tactile, being delivered by a tactile alerting device 1018, such as a motor which spins an unbalanced mass. The alert can also be visual, being delivered by a visual alerting device 1022, such as an incandescent lamp or an LED. The alert can be reset by way of switches 1020 which are also used to recover the message information which was received for viewing on a display 1024, such as a liquid crystal (LCD) display which can be adapted to display numeric information or alphanumeric information.

While specific embodiments of this invention have been shown and described, further modifications and improvements will occur to those skilled in the art. All modifications which retain the basic underlying principles disclosed and claimed herein are with the scope and spirit of the present invention.

I claim:

1. A belt clip, for a device having an area to be viewed, comprising a U-shaped member which is intended to be hooked over a belt, said U-shaped member comprising
  a pivot, comprising
    a first boss having a profile which is circular, and
    a second boss having a profile which is circular with a flat cut parallel to a longitudinal axis of said pivot,
    said pivot being coupled to a rear surface of a housing to enable rotation of said housing relative to said U-shaped member,
  a first clip element, coupled to said pivot, and having a free end including a boss, and
  a second clip element, coupled to said pivot, and having a free end,
wherein said housing has a cavity which engages said boss to prevent a relative rotation between said housing and said U-shaped member whenever a force is exerted on said free end of said second clip element, and
wherein said boss disengages said cavity whenever a force is applied to said free end of said first clip element thereby deforming the same to release said boss from said housing to allow said housing to be rotated to observe the area to be viewed, and wherein said housing includes a first bearing member and a second bearing member which are formed on said rear surface of said housing opposite said bottom surface of said housing for engaging said pivot,
  said first bearing member includes a circular cavity, and said second bearing member includes a circular cavity and a slot formed perpendicular to an axis of said circular cavity, and wherein
  one surface of said slot is tangent to a circumference of said circular cavity of said second bearing member, and the axis of said slot is at a predetermined angle between a fully open and a fully closed position of said U-shaped member relative to said housing.

2. The belt clip of claim 1, wherein said free end of said first clip element further includes a release mechanism to facilitate disengaging said boss using a finger.

3. The belt clip of claim 1, wherein said profile of said second boss subtends an arc-length greater than 180°.

4. The belt clip of claim 1, wherein the depth of said slot is less than the depth of said cavity in said second bearing member.

5. The belt clip of claim 1 wherein said second clip element is a planar beam, and wherein said first clip element conforms to said rear surface and wraps around said bottom surface of said housing.

6. The belt clip of claim 1, wherein said first clip element, said second clip element and said pivot are constructed as a single device.

7. The belt clip of claim 6, wherein said pivot has an axis which is below a midpoint between first clip element and said second clip element.

8. A communication device comprising:
  a receiver for receiving messages;
  a display for displaying the messages received;
  a housing, having a rear surface and a bottom surface, which encloses said receiver and said display, said housing further including
    a first bearing member and a second bearing member which are formed on said rear surface of said housing opposite said bottom surface of said housing for engaging a pivot, wherein
    said second bearing member is opposed to said first bearing member and wherein an axis of said first bearing member and said second bearing member is concentric to an axis of said pivot, and wherein
    said first bearing member includes a circular cavity, and
    said second bearing member includes a circular cavity and a slot formed perpendicular to the axis of said circular cavity, wherein one surface of said slot is tangent to the circumference of said slot of said second bearing member, and an axis of said slot is at a predetermined angle between a fully open and a fully closed position of said U-shaped member relative to said housing; and
  a U-shaped belt clip, intended to be hooked over a belt, comprising
    a pivot, having an axis about which it rotates, and which is coupled to said housing to enable rotation of said housing relative to said U-shaped belt clip, said pivot comprising
      a first boss having a profile which is circular, and a second boss having a profile which is circular with a flat cut parallel to a longitudinal axis of said pivot,
    a first clip element, coupled to said pivot, and having a free end including a boss, and a second clip element, coupled to said pivot, and having a free end, wherein said housing has a cavity which engages said boss to prevent a relative rotation between said housing and said U-shaped belt clip whenever a force is exerted on said free end of said second clip element, and wherein said boss disengages said cavity whenever a force is applied to said free end of said first clip element thereby deforming the same to release said housing from said boss and allow said housing to be rotated to view said display.

9. The communication device of claim 8, wherein said free end of said first clip element further includes a release mechanism to facilitate disengaging said boss using a finger.

10. The communication device of claim 8, wherein said profile of said second boss subtends an arc-length greater than 180°.

11. The communication device of claim 8, wherein said first clip element, said second clip element and said pivot are constructed as a single component, and wherein said first clip element is substantially parallel to said second clip element.

12. The communication device of claim 8, wherein said pivot has an axis which is below a midpoint between first clip element and said second clip element.

* * * * *